Figure 2:
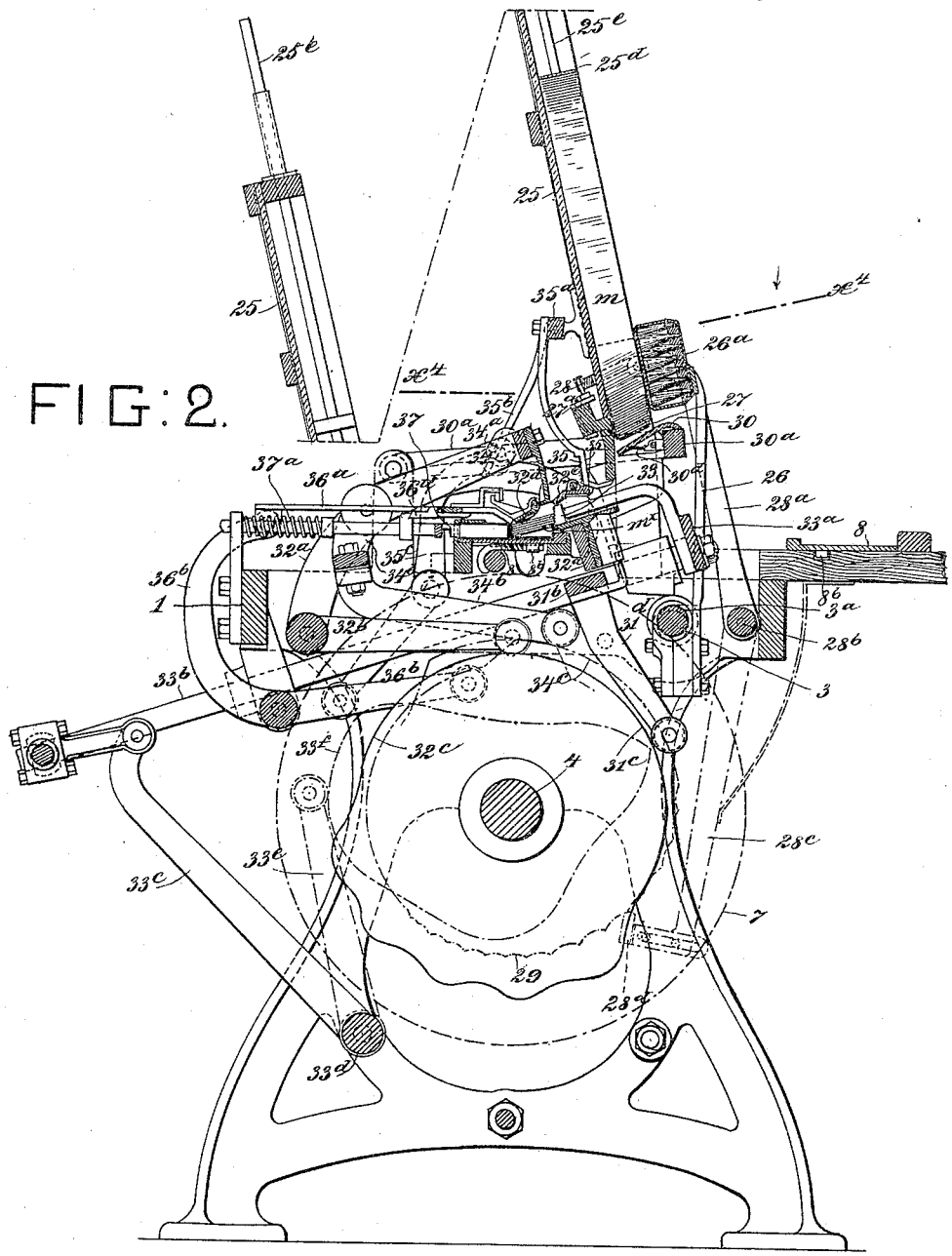

(No Model.) 9 Sheets—Sheet 1.

A. LAGERMAN.
MACHINE FOR FILLING MATCH BOXES.

No. 604,565. Patented May 24, 1898.

FIG. 1.

WITNESSES:

INVENTOR
Alexander Lagerman
BY
ATTORNEY (No Model.) 9 Sheets—Sheet 3.

A. LAGERMAN.
MACHINE FOR FILLING MATCH BOXES.

No. 604,565. Patented May 24, 1898.

WITNESSES:
F. H. Wiman
Peter A. Ross

INVENTOR
Alexander Lagerman
BY
Henry Connett
ATTORNEY (No Model.) 9 Sheets—Sheet 4.

A. LAGERMAN.
MACHINE FOR FILLING MATCH BOXES.

No. 604,565. Patented May 24, 1898.

WITNESSES:
INVENTOR
Alexander Lagerman
BY
Henry Connett
ATTORNEY

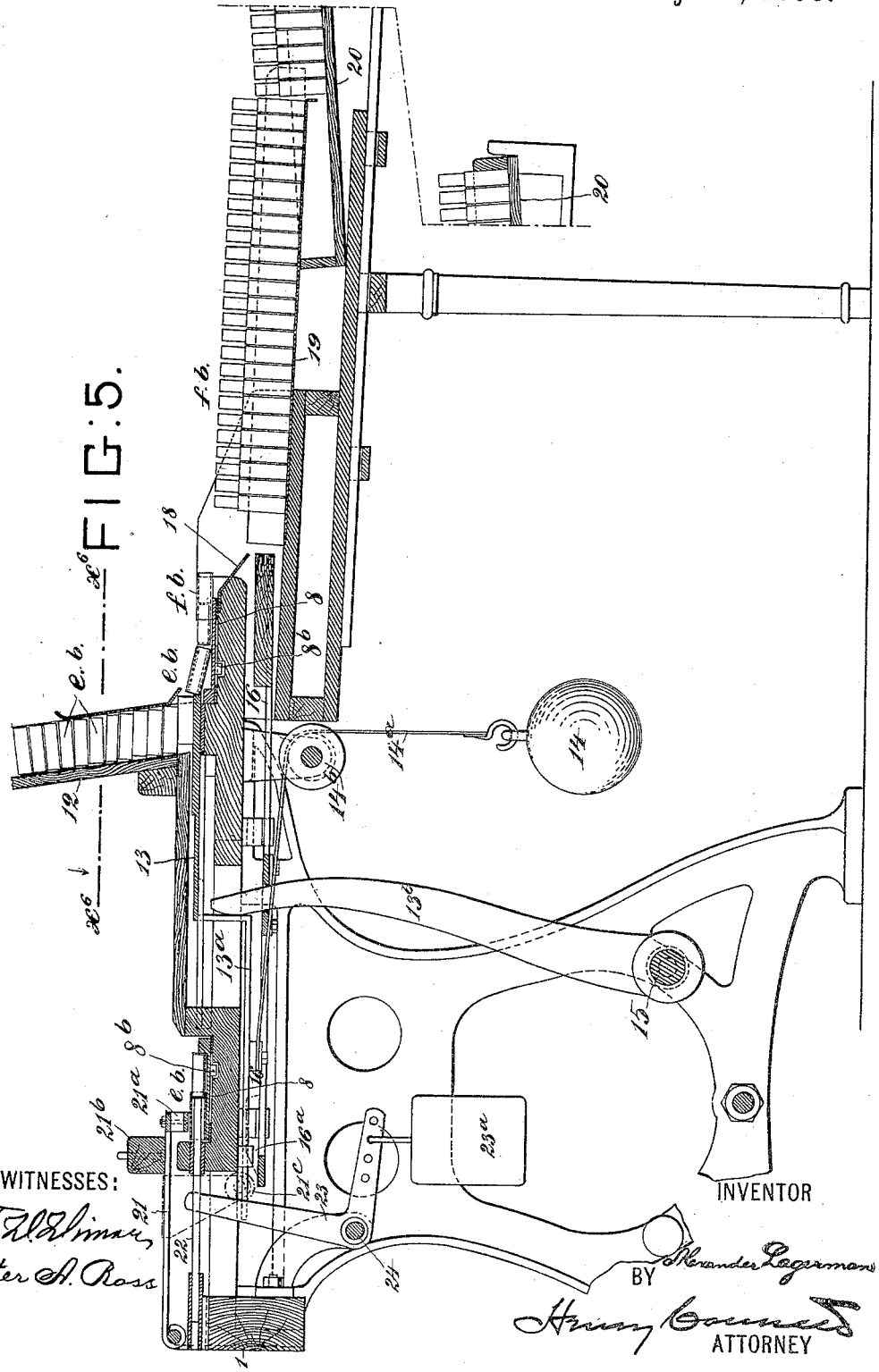

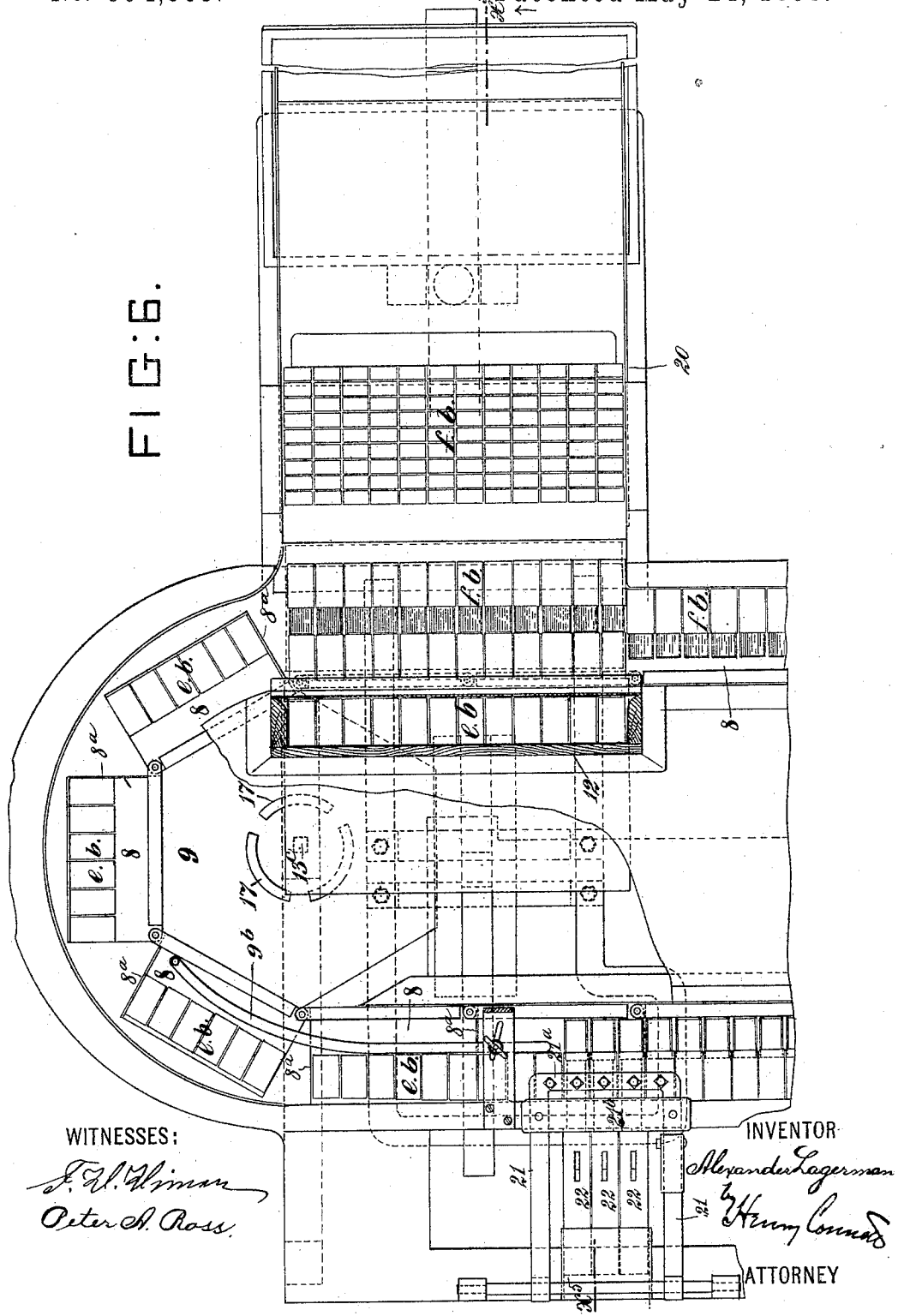

(No Model.) 9 Sheets—Sheet 7.
A. LAGERMAN.
MACHINE FOR FILLING MATCH BOXES.
No. 604,565. Patented May 24, 1898.
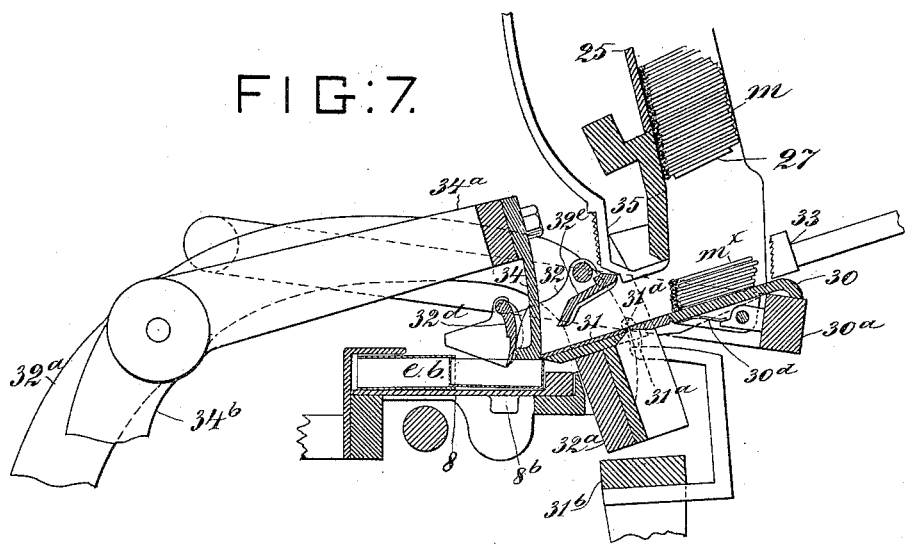
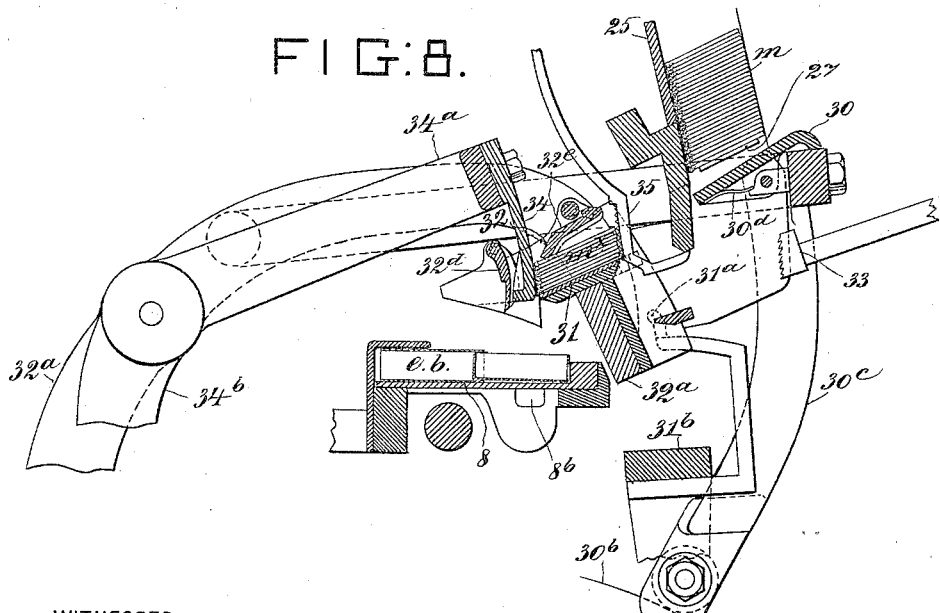
WITNESSES:
INVENTOR
Alexander Lagerman
BY
Henry Connett
ATTORNEY (No Model.) 9 Sheets—Sheet 8.
A. LAGERMAN.
MACHINE FOR FILLING MATCH BOXES.
No. 604,565. Patented May 24, 1898.
FIG: 9.
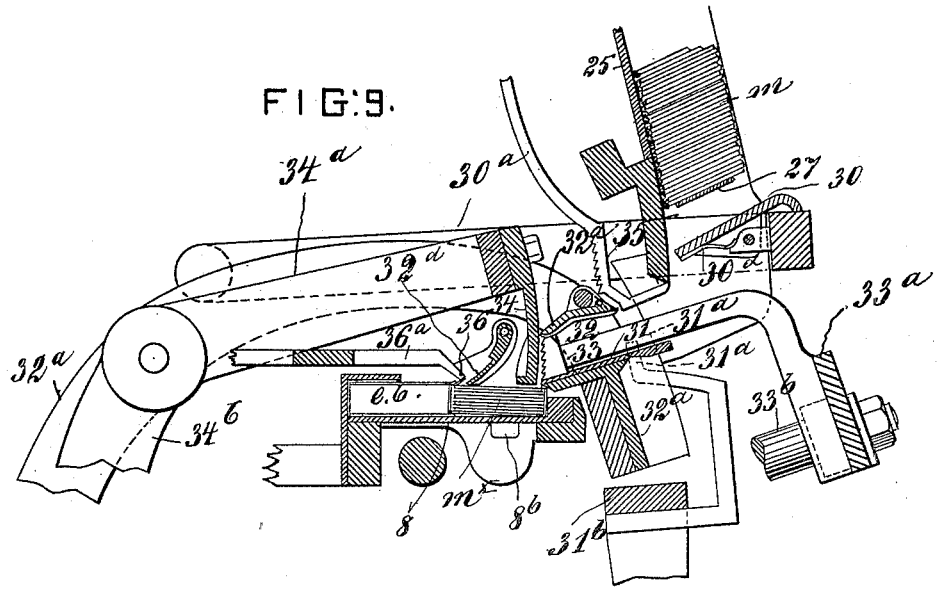
FIG: 10.
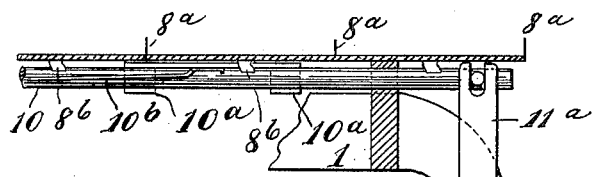
FIG: 12.
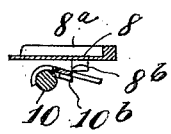
FIG: 11.
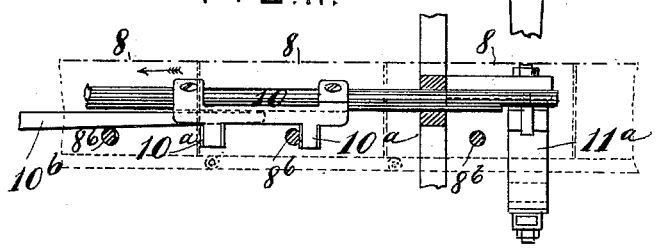
WITNESSES:
F. H. Zimay
Peter N. Ross
INVENTOR
Alexander Lagerman
BY
Henry Connett
ATTORNEY

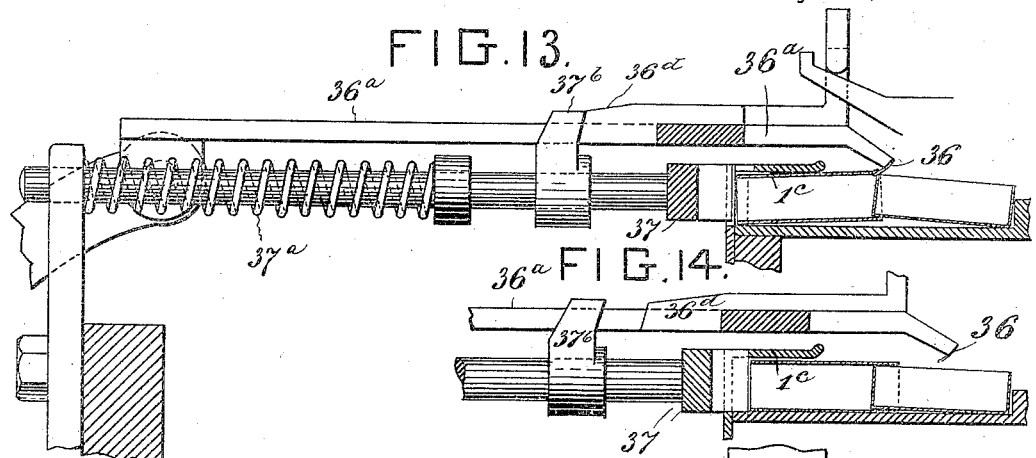
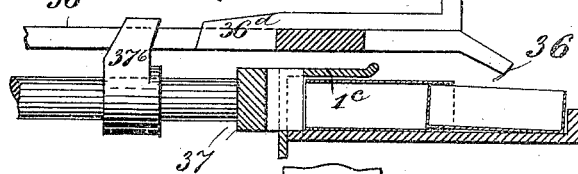
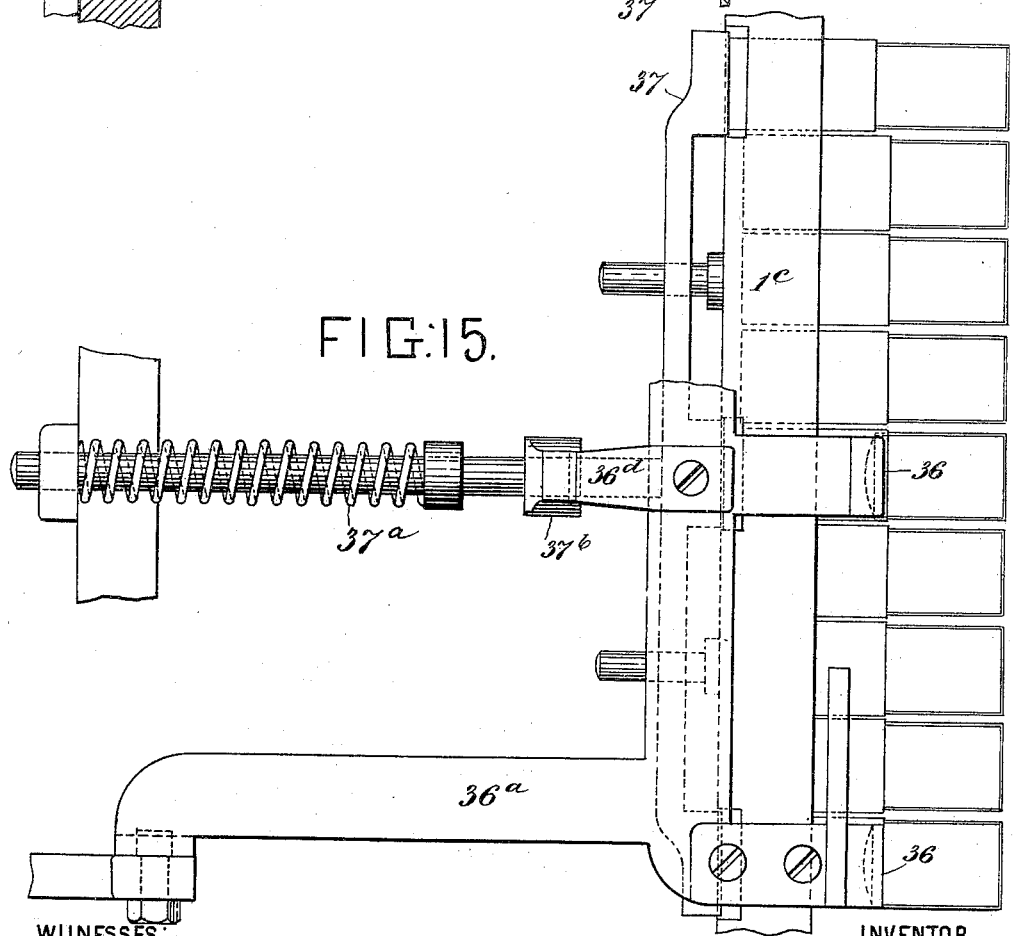

UNITED STATES PATENT OFFICE.

ALEXANDER LAGERMAN, OF JÖNKÖPING, SWEDEN, ASSIGNOR TO JÖNKÖ-PINGS TÄNDSTICKS-FABRIKS AKTIEBOLAG, OF SAME PLACE.

MACHINE FOR FILLING MATCH-BOXES.

SPECIFICATION forming part of Letters Patent No. 604,565, dated May 24, 1898.

Application filed May 28, 1897. Serial No. 638,499. (No model.)

*To all whom it may concern:*

Be it known that I, ALEXANDER LAGERMAN, a subject of the King of Sweden and Norway, and a resident of Jönköping, in the Kingdom of Sweden, have invented certain new and useful Improvements in Machines for Filling Boxes with Matches, of which the following is a specification, reference being had therein to the accompanying drawings, which illustrate an embodiment of the invention.

This invention relates to a machine for filling boxes with matches, the machine being so constructed as to fill several boxes at a time. For this purpose the empty drawers of the match-boxes, inserted into their respective cases, and also the matches, are placed in wide magazines, the boxes in horizontal rows and the matches so as to form a pile which is continuous at the top and divided at the bottom into several branches. From the magazine containing the boxes the bottom row of boxes is ejected onto an endless-chain carrrier which transports them to the match-magazine, at which the filling takes place. The box and match magazines form, so to speak, "division" points or stations in the endless path described by the carrying-chain, and while traveling from one to the other the drawers of the boxes are at another station pushed sufficiently far out of their cases to allow of the matches being introduced into the drawers. The boxes then pass on to the starting-point in the path of the chain, where they are ejected from the machine through an outlet provided for the purpose. While passing from the match-magazine to said point, the drawers are only partly pushed into their cases, so that the machine-tender can easily examine them and exercise control over the proper filling of the boxes.

Figure 3:
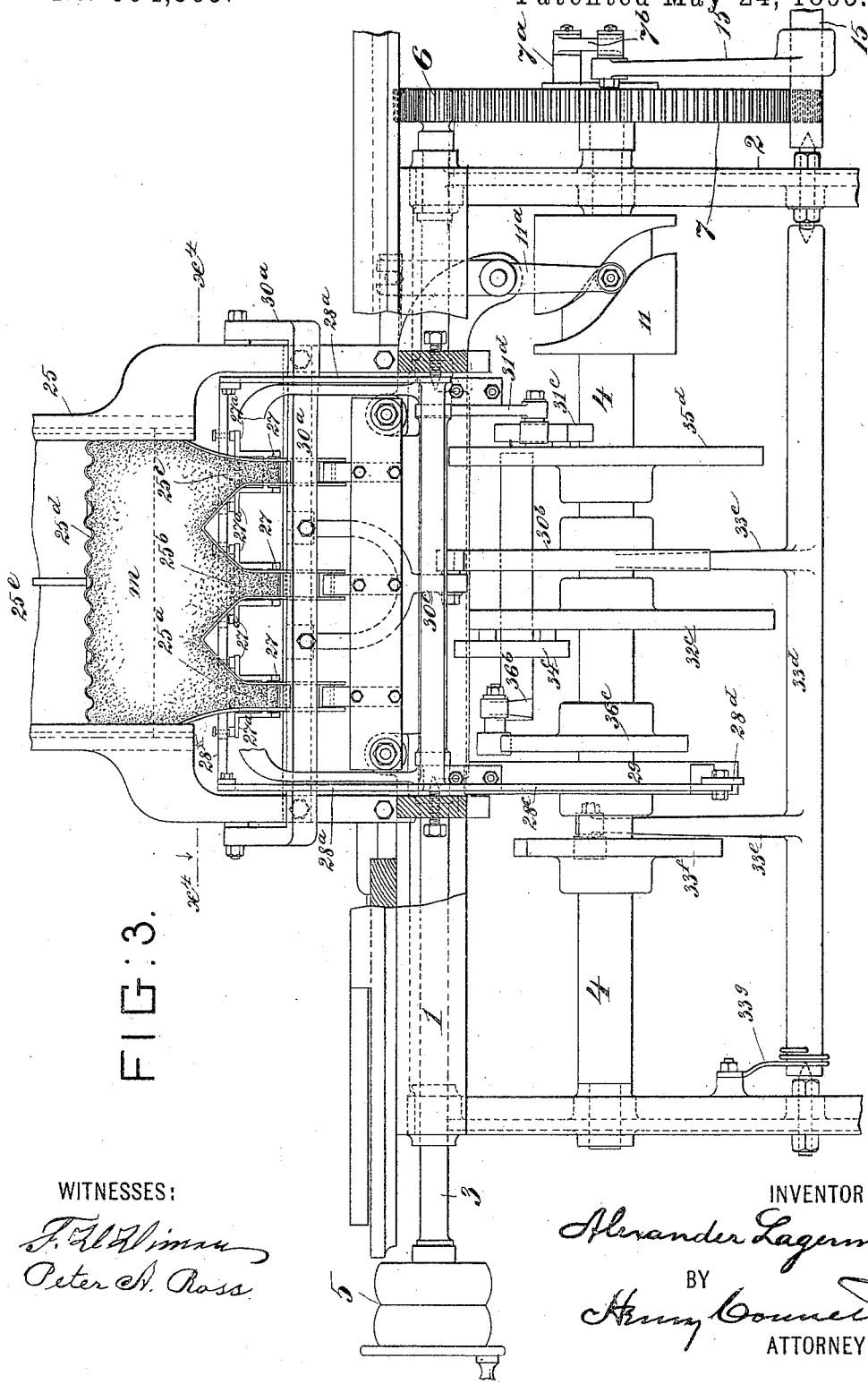
Figure 4:
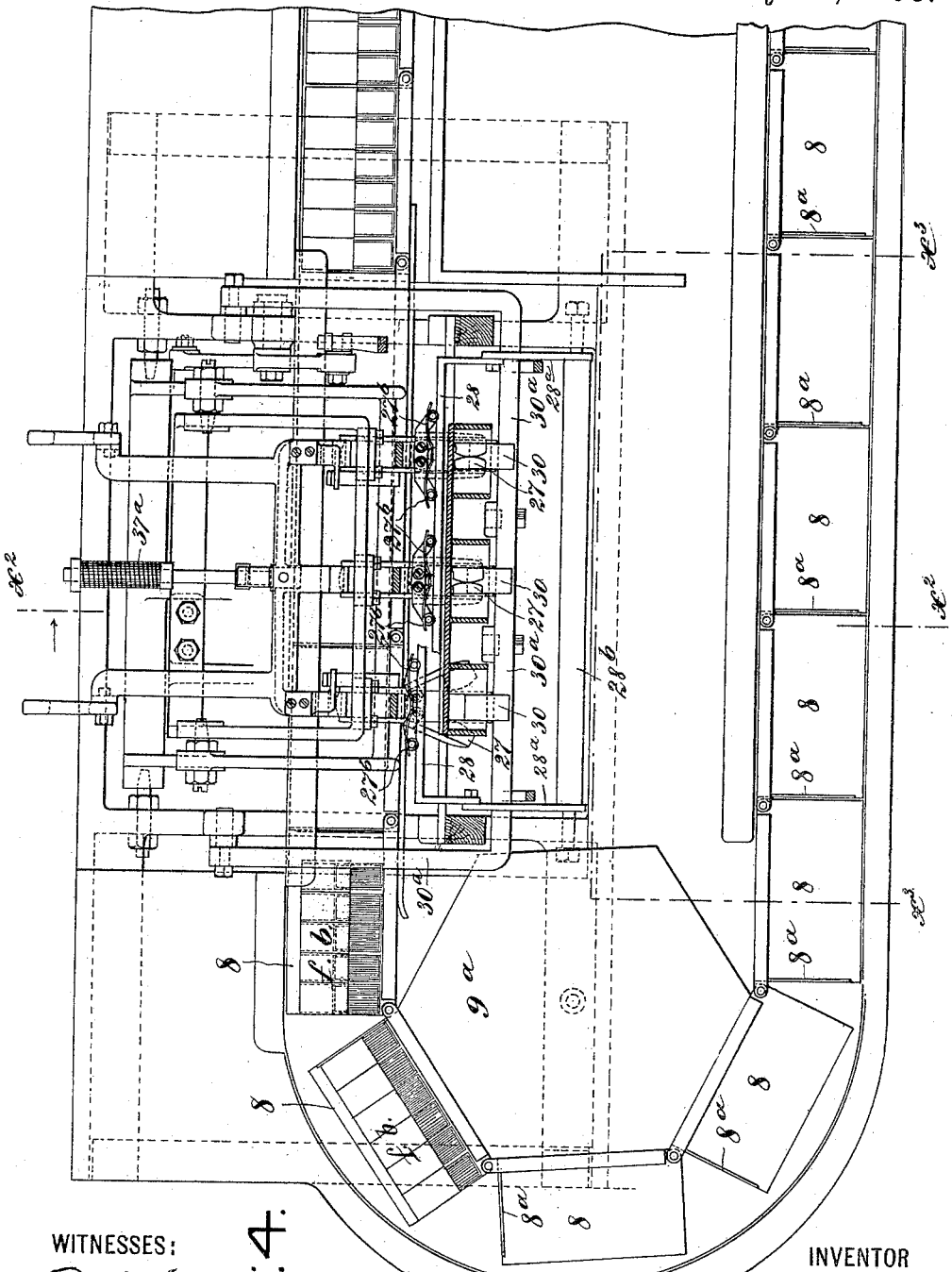

In the accompanying drawings, which illustrate an embodiment of the invention, Figure 1 is a side elevation of the whole machine on a relatively small scale. As the machine may be made of any convenient length, the bed or frame thereof is shown as broken across in this figure. Fig. 2 is a vertical transverse section on line $x^2$ in Fig. 4, showing that division of the machine where the boxes are filled. In this view the extreme upper part of the match-magazine is broken away for lack of room and the severed portion shown at the left of the principal view. Fig. 3 is a front elevation of the same division of the machine as Fig. 2, partly broken away, substantially as indicated by line $x^3$ in Fig. 4. Fig. 4 is a sectional plan of this division of the machine, the plane of the section being indicated by line $x^4$ in Fig. 3. Fig. 5 is a vertical transverse section, on line $x^5$ in Fig. 6, of that division of the machine where the empty boxes are fed to it from the box-magazine. Fig. 6 is a sectional plan of this division of the machine, the plane of the section being indicated by line $x^6$ in Fig. 5. Figs. 7, 8, and 9 are sectional detail views, on a large scale, illustrating the box-filling mechanism in three different positions. Figs. 10, 11, and 12 illustrate the mechanism for operating the carrier, Fig. 10 being an edge elevation, Fig. 11 a plan, and Fig. 12 a vertical cross-section showing the rocking of the sliding rod. Figs. 13, 14, and 15 are detail views, on a larger scale, illustrating the mechanism for putting the boxes in shape for filling. The first two are sectional elevations showing the parts in different positions and the latter is a plan.

By reference to Fig. 1 it will be seen that the machine is somewhat elongated, the mechanism A for supplying the empty boxes being at the extreme right in this figure and the mechanism B for filling the boxes being at the left. The endless-chain carrier (seen best in Figs. 3 and 5) moves in a horizontal plane.

The main table, bed, or frame 1 of the machine is supported on suitable legs 2 and has rotatively mounted in it a driving-shaft 3 and a cam-shaft 4. On the driving-shaft are tight and loose pulleys 5 and a pinion 6, which gears with a spur-wheel 7 on the cam-shaft, and through these gear-wheels the shaft 3 drives the shaft 4. On the frame or table 1 is mounted an endless carrier composed of plates 8, hinged together at their inner corners, flanged at their inner edges, and each provided with a raised flange $8^a$ at one end. This endless chain of plates plays about rotatively-mounted hexagonal wheels or disks 9 and $9^a$ on the frame, as clearly shown in Figs.

4 and 6. On the under side of each plate 8 there is a downwardly-projecting short beveled pin or stud $8^b$, (seen in Figs. 10, 11, and 12,) the first being an edge or side view, the second a plan view of the parts below the plates 8, (these latter being indicated in the view by dotted lines,) and the third a cross-section. These beveled pins or studs are engaged by lugs $10^a$, projecting laterally from a longitudinally-arranged slidable rod 10, mounted in the frame. This rod has a reciprocating endwise motion imparted to it by a grooved cam 11, Figs. 1 and 3, on the cam-shaft 4 through the medium of an upright lever $11^a$, the upper end of which is coupled by a fork to a pin in said rod and the lower end of which has a stud engaging the groove in the cam 11. The reciprocating movement of the rod imparts to the endless carrier an intermittent forward movement equal to one-half the length of a plate 8. In its receding movement the rod 10 is rocked or rotated to an extent sufficient for the beveled lugs $10^a$ to wipe over the short beveled studs $8^b$ on the plates and take behind them.

The coupling of the rod 10 to the lever $11^a$ is such as to permit the rod to rock, as seen in Fig. 12, which shows the stud $8^b$ wiping past a beveled lug $10^a$. The rod is rocked back to its normal or first position by a spring $10^b$ on the frame, which takes under one of the lugs $10^a$.

12 is the magazine or case, which contains the empty match-boxes $e\ b$, arranged in tiers. This device is best seen in Figs. 1, 5, and 6. Each plate 8 of the carrier is adapted to receive six boxes, Fig. 6. Transversely of the frame and just above the level of the plates 8 is mounted on the machine-frame, Fig. 5, a broad reciprocating pusher 13, which plays under the bottom of the magazine 12 and pushes out the bottom tier of boxes onto the plates of the endless carrier. The forward operative movement of the pusher 13 is effected by a weight 14, connected through a strap or cord $14^a$ to a rear extension $13^a$ of the pusher 13, the strap passing over a guide-sheave $14^b$ in the machine-frame, and the rearward movement of the pusher is effected by an arm $13^b$, the upper end of which takes in front of a shoulder on the pusher. This arm $13^b$ is fixed to a rock-shaft 15, mounted in the lower part of the machine-frame and extending longitudinally thereof, said shaft being rocked by mechanism (seen in Figs. 1 and 3) and comprising a crank-pin $7^a$ in the wheel 7, an arm $15^a$ on the rock-shaft 15, and a link $7^b$, connecting said arm with said crank-pin. The arm $13^b$ also reciprocates a slide 16, Fig. 5. The pusher 13 has on it a stud $13^c$, Fig. 6, which can play into or through one of several spaces between the segments of a cut or ring 17, mounted on the hexagonal disk 9 when the said space is brought into its line of movement.

It will be understood that the pusher 13, Fig. 5, pushes out the lower tier of empty match-boxes $e\ b$ onto the plates 8 of the waiting carrier, they displacing the filled boxes (after the machine has got to running) at this point, the latter $f\ b$ being represented in Fig. 5 as having slid down the incline 18 into a trough 19, where they rest on their ends, with their drawers partly projecting. The slide 16 is reciprocated at each stroke or operation of the machine, and it pushes the filled boxes back as fast as they are displaced from the carrier. The pusher 13 does not reciprocate with each operation, as it will only be advanced by the weight 14, when the rotative movement of the disk 9 brings a space between the segments of the ring 17 into line with it, and as each space in said ring corresponds to two of the plates 8 of the carrier it will be seen that the pusher only operates once for each two plates 8. The filled boxes $f\ b$ are moved along until they fall into a tray 20 and are carried away. After being placed on the plates of the carrier—six on each—and pushed over against the outer flange thereon the empty boxes are carried around the end of the machine, Fig. 6, where the disk 9 is situated, to the point where the drawers of the boxes are pushed out from their cases. This point is nearly opposite to the point where the empty boxes are placed on the carrier, and the mechanism for pushing out the drawers is best seen in Figs. 5 and 6.

A frame 21 is hinged at its outer end to the frame 1, said frame having a bar $21^a$ at its inner or free end, which takes over the empty boxes on the carrier and is adapted to rest or bear on the same. Preferably the lower face of the bar $21^a$ will be faced with rubber or some similar soft material to prevent its slipping on the boxes, and the frame may have a suitable weight $21^b$ to press it down. On the rear end of the slide 16 is an inclined cam $16^a$, which is adapted when said slide is drawn back to take under a roller $21^c$, pendent from the frame 21, and elevate said frame.

While the boxes $e\ b$ are being held by the pressure on them of the bar $21^a$, the drawers are pushed part of the way out by a set of sliding plungers 22, operated by bell-cranks and weights. The bell-cranks 23 on the shaft 24 have their upright arms engaged with slots in the respective plungers 22 and have on their other arms weights $23^a$. The weights do not act with a positive force, but with a force conditioned on the resistance, so that in case a drawer does not move in its case for some reason the box will not be crushed. The plungers 22 are withdrawn from the cases by the rear end of the slide 16 impinging against the upright arms of the bell-cranks 23, when said slide 16 recedes or draws back.

In Fig. 6 is seen a fixed but adjustable curved guide $9^b$, arranged over the carrier where the empty boxes approach the point where the drawers are pushed out. This guide assures that the boxes on the plates 8 shall be pushed up to the flange on the main frame at this point. The endless carrier now moves on, carrying the boxes, with their drawers pushed nearly out of their cases, to the filling-point under the match-magazine at B, and the mechanism for filling the drawers will now be described with especial reference to Figs. 1, 2, 3, 4, 7, 8, and 9.

The match-magazine 25 is mounted on the machine-frame in an upright slightly-inclined position, as seen in Fig. 2, and is divided at its lower part into three outlets $25^a$, $25^b$, and $25^c$, as seen in Fig. 3. On the mass of matches $m$ in the magazine rests a corrugated plate $25^d$, which serves to keep them in position. This plate has a stem $25^e$.

On the shaft 3 are formed two short cranks or eccentrically-turned journals $3^a$, Fig. 2, on which is mounted a frame 26, carrying a leather-covered brush $26^a$, which faces toward the match-magazine, as seen in Fig. 2. This brush moves rapidly up and down as the shaft 3 rotates against the untipped or uncoated ends of the matches in the magazine and causes the closely-packed matches to divide and flow down into the several outlets or chutes at the bottom, these latter each having a width equal to the inside width of the drawer of the match-box. Preferably the brush $26^a$ will have given to it as nearly as possible the movement of a hand pressed gently on the ends of the matches in the pile, then moved rapidly up and down for a limited distance, and the pressure then relieved for a moment. The mechanism employed imparts substantially this movement; but this mechanism may of course be varied somewhat. The brush is not shown in Figs. 1, 3, and 4, as its presence would obscure other mechanism. Fig. 2 shows its position and construction with sufficient clearness.

At each delivery-chute of the match-magazine there is a pair of shutters 27, adapted to close in from the sides and cut off from the descending column of matches in each branch chute a quantity sufficient to fill the drawer of a box. Each shutter is hinged to the frame which supports the match-magazine by means of horizontal arms hinged on a vertical pivot, and on it is fixed a crank-arm $27^a$, set substantially at right angles to the shutter. Springs $27^b$, bearing on the pins in said crank-arms of the shutters, tend to close the shutters, and they are opened or moved away from each other by means of a bar 28, which extends along in front of the pins in the several crank-arms and is connected to arms $28^a$, fixed to a rock-shaft $28^b$ in the machine-frame. On this rock-shaft is an arm $28^c$, which extends downwardly and has at its free end a bearing-piece $28^d$, which bears against the periphery of a cam 29 on the cam-shaft 4. This cam, together with the springs $27^b$, impart the proper reciprocating motion to the shutters, and as these latter are made to close by a spring and not by a positive force the shutters will yield or be arrested in case they meet with any difficulty in penetrating the pile of matches.

In Fig. 4 for purposes of illustration the bar 28 is represented as broken and the part at the left shown as pressed back by the cam.

At the lower end of each of the match-magazine chutes is a receiving-plate 30, Figs. 2, 3, 4, 7, 8, and 9, which is carried by a frame $30^a$, hinged in brackets on the machine-frame. This frame has an up-and-down motion imparted to it by a cam $30^b$ on the cam-shaft 4 through the medium of an arm $30^c$ on the frame, which arm has a roller to bear on the periphery of the cam. This construction is seen in Fig. 3. The plate 30 is hinged to the frame, as clearly seen in Figs. 7, 8, and 9, and has under it, at one edge, a spring $30^d$, so that it may yield in case undue pressure is brought upon it, as may happen if some matches adhere to the under surface of the shutters 27. It may be said here that the portion of the periphery of the cam 29, which serves to drive the shutters in between the matches, may be corrugated, as seen in Fig. 2, so as to impart a shaking motion to said shutters as they move into the mass of matches, whereby they will enter more easily.

In the operation of the machine, Figs. 2, 7, 8, and 9, the plate 30 is moved up to about the position seen in Fig. 9, the shutters 27 are drawn back, and the mass of matches $m$ in the magazine-chute falls upon said plate. The shutters 27 now close again, cutting off the proper quantity of matches to fill a box. This quantity is lettered $m^\times$ in Fig. 7 merely for distinction from the mass $m$. The plate 30 is now lowered to the position seen in Fig. 7, when its inclined surface, on which the matches rest, coincides with the surface of a sliding plate 31 in the bottom of a receiving-cell 32, into which the pile of matches $m^\times$ is pushed by a plunger 33. This plunger is secured to a bar $33^a$, Fig. 2, which is secured to two guide-rods $33^b$ in the frame, these rods being coupled to the free end of an arm $33^c$ on a rock-shaft $33^d$ in the frame. Fixed to the rock-shaft $33^d$ is another arm $33^e$, which carries a roller that bears on an operating-cam $33^f$ on the shaft 4, being held up to the cam by any suitably-arranged spring $33^g$, Fig. 3. When the plunger 33 shall have pushed the matches into the cell 32, it withdraws. In front of the cell 32 is a stop and depressor 34, against which the tipped ends or heads of the matches rest. This depressor is secured to a frame $34^a$, hinged or pivoted to rock on the machine-frame, so that the depressors may be raised and lowered, and said frame is actuated through the medium of a curved arm $34^b$, carrying a roller which bears on a cam $34^c$, said roller being held down on the cam by gravity. The cell 32, which is of the proper width to drop into the drawer of the match-box, is movable up and down also, and it is carried by a swinging frame $32^a$, which has an arm $32^b$, carrying a roller which rests on an operating-cam $32^c$ on the shaft 4. The cams raise the cell and depressor, as well as the matches in the cell, to the position seen in Fig. 8, whereat the ends of the matches are brought up to the roughened surface of a shaker or adjuster 35, which by its vibration settles and adjusts the matches in the pile and causes their somewhat enlarged heads to pack together the better. This adjuster 35 is attached to a bar $35^a$, journaled in brackets on the back of the match-magazine, Fig. 2, and on this bar is an arm $35^b$, which engages a fork in one arm of a rocking lever $35^c$, fulcrumed in the main frame, the other arm of said lever carrying a roller which bears on a cam $35^d$ on the shaft 4. This cam imparts the proper vibrating motion to the adjuster. The depressor and cell are now lowered to the position seen in Fig. 7, the depressor is raised, and the plunger 33 advances again, this time far enough to push the matches $m^\times$ into the drawer of the match-box, after which the depressor again descends and presses them down, as seen in Fig. 9.

In order that the matches may be properly entered into the drawer of the box, there is a device for holding back the case of the box and a peculiar function of the sliding plate 31, which will now be described.

A thin hook 36, mounted to slide on the main frame, moves over and catches under the upper margin of the match-box case, and its under beveled end serves to guide the heads of the matches, while hinged spring-flaps $32^d$ and $32^e$ on the cell 32 bear on the moving matches as they enter the drawer and tend to press them down gently. The several hooks 36 are secured to a frame $36^a$, coupled to a lever-arm $36^b$, Fig. 2, carrying a roller bearing on a cam $36^c$ on the cam-shaft.

37 is a plunger mounted to slide on and transversely of the main frame and to act in conjunction with the hooks 36, last described, for pushing the cases over the filled drawers at the filling-point, Figs. 13, 14, and 15. The plunger has several heads adapted to bear on the ends of as many cases, and it is backed by a spring $37^a$. There is a shoulder $37^b$ on the plunger-stem, which is in the path of a lug $36^d$ on the frame $36^a$, whereby when the hooks 36 move back or withdraw this lug draws back the plunger, compressing the spring $37^a$. After the drawer of the box is filled with matches the hooks 36 and their carrying-frame advance again, thus permitting the spring $37^a$ to advance the plungers and push the cases over their drawers to any desired extent, but preferably only partially, as before stated. In the detail views, Fig. 13 shows the plunger pushed back, and Fig. 14 shows the hook 36 advanced and the plunger also advanced up to a stop in a plate $1^c$ on the table or frame. The frame and hooks move forward farther than the plungers, as will be noted in Fig. 14. The engagement of the hook 36 with the end of the case and the tilting of the case and drawer has been slightly exaggerated in the drawings for the better illustration of the operation.

The sliding bottom 31 of the cell 32 is designed to move in far enough to take over the margin at the end of the drawer of the match-box while the matches are being pushed in over said bottom plate and then to draw back slightly, so that the matches may drop into the drawer. The movement is very slight, and each of the bottom plates 31 is drawn back by uprights $31^a$ on a bar $31^b$, actuated by a cam $31^c$ through an arm $31^d$. When the cells are elevated, the sliding bottom plate is lifted free from said uprights $31^a$; but when the cells descend the said uprights enter apertures or slots in the respective bottom plates and are thus adapted to operate the latter.

It will be understood from the foregoing description that the machine is intermittently continuous and automatic in its working, each operation being completed at one rotation of the cam-shaft 4. The machine, as described, feeds out twelve boxes at one time and fills three; but this arrangement is only for convenience, as will be readily understood by any skilled workman. The boxes, both empty and filled, are open to inspection during the operation of the machine, so that the attendant may see that the machine is working properly.

The mechanical details of the machine may of course be altered to some extent without departing materially from the essential features of the invention, and the various cams will be of such forms and proportions as to produce the movements desired.

Having thus described my invention, I claim—

1. In a machine for filling match-boxes, the combination with a table or main frame to support the mechanism, an endless carrier on said frame, and mechanism for moving said carrier intermittently, of an upright match-box magazine mounted on the main frame over said carrier and adapted to contain the empty boxes arranged in tiers, a plunger adapted to push out the lower tier of boxes onto the carrier, mechanism for operating said plunger, mechanism for pushing the drawers of the boxes on the carrier from their cases, mechanism for placing the matches in the drawers of the boxes, and mechanism for drawing the cases of the boxes over the filled drawers, said mechanisms being situated adjacent to the carrier, and at different points therealong, substantially as set forth.

2. In a machine for filling match-boxes, the combination with the main frame or table to support the mechanism, and a box-filling mechanism for the matches, of the endless carrier for the boxes mounted thereon and comprising the flanged plates 8, hinged together and each having a beveled stud $8^a$, and the polygonal, horizontally-arranged, rotatable disks, 9 and $9^a$, of the slidable rod 10, mounted in the main frame and having laterally-projecting lugs $10^a$, adapted to engage the studs on the plates 8 for intermittently advancing the carrier, and mechanism substantially as described for imparting a reciprocating movement to the rod 10, substantially as set forth.

3. In a machine for filling match-boxes, the combination with the main frame or table supporting the mechanism, and an intermittently-moving carrier mounted on said main frame, of the upright magazine 12, for the reception of the empty boxes $e$, $b$, in tiers, the pusher 13, adapted to push out the lowermost tier of boxes from the magazine, said pusher being mounted to slide to and fro on the machine-frame, a weight 14, adapted to move the pusher forward in expelling the boxes, positive mechanism, substantially as described for withdrawing the pusher, and a stop to regulate the forward movements of the pusher, said stop comprising the intermittently-rotating disk 9, of the carrier provided with raised segments 17 on its surface, and a stud $13^c$, carried by the pusher, said segments being adapted for interposition into the path of the stud $13^c$ during certain parts of the rotation of said disk 9, substantially as set forth.

4. In a machine for filling match-boxes, the combination with the main table or frame supporting the mechanism, and an intermittently-moving carrier, mounted on said frame, for carrying the boxes, of the mechanism for pushing the drawers of the empty boxes from their cases, said mechanism comprising a movable bar $21^a$, which rests upon and holds down the box-case, a weight carried by said bar, means for raising said bar to release the case, a slidable plunger 22, which pushes out the drawer of the box from its case while the latter is held stationary, a weight $23^a$, which imparts the operative, forward movement to said plunger, and mechanism, substantially as described, for withdrawing said plunger, substantially as set forth.

5. In a machine for filling match-boxes, the combination with the main frame, the carrier mounted thereon for supplying empty boxes to the filler, and an upright magazine for the matches, said magazine having a chute or chutes at its bottom to lead the matches to the box to be filled, of an intermittently-operating vibrating brush $26^a$, situated in front of the match-magazine and adapted to bear on the uncoated ends of the matches and by shaking them cause them to descend freely to the box-filling point, substantially as set forth.

6. In a machine for filling match-boxes, the combination with the upright match-magazine having a chute at its bottom for the delivery of the matches, of a cut-off in said chute consisting of a pair of shutters 27, hinged on vertically-arranged pins so as to swing in a curved path into the chute, entering the same first near the heads of the matches therein, and mechanism for closing and opening said shutters simultaneously, substantially as set forth.

7. In a machine for filling match-boxes, the combination with the upright match-magazine having a chute at its bottom for the delivery of the matches to the filling-point, of a cut-off in said chute consisting of a pair of shutters 27, adapted to move in and out simultaneously with a tremulous motion, a cam with an undulating or wavy periphery, mechanism between said cam and shutters whereby the cam moves them out in one direction, and springs for holding them against the undulating movement derived from the cam and for moving them in the opposite direction, substantially as set forth.

8. In a machine for filling match-boxes, the combination with an upright match-magazine having a chute at its bottom for the delivery of the matches to the filling-point, of a cut-off in said chute consisting of a pair of shutters 27, hinged on upright axes, mechanism substantially as described for opening said shutters, and springs which close the shutters with a yielding force or pressure, substantially as set forth.

9. In a machine for filling match-boxes, the combination with an upright match-magazine having a chute at its bottom for the delivery of the matches to the filling-point, of a cut-off in said chute, consisting of a pair of swinging shutters 27 hung on upright hinge-axes, whereby they are adapted to close and to open simultaneously, mechanism substantially as described for operating the shutters, a movable, inclined bottom 30 in the chute which receives the matches cut off by the shutters, mechanism which moves said bottom and a reciprocating plunger 33, arranged under the chute, which pushes the matches so separated into the box, substantially as set forth.

10. In a machine for filling match-boxes, the combination with the upright match-magazine having a chute at its bottom and means substantially as described for separating a measured quantity, $m^x$, of matches from said chute to fill a box, of the vertically-movable cell 32, to receive the matches, mechanism for operating said cell, the movable depressor, 34, at the delivery end of said cell, mechanism for operating said depressor, and the reciprocating plunger adapted to push the matches into the cell and from the cell into the box, substantially as set forth.

11. In a machine for filling match-boxes, the combination with the upright match-magazine having a chute at its bottom and means substantially as described for separating a measured quantity, $m^x$, of matches from said chute to fill a box, of the vertically-movable cell 32, to receive the matches, mechanism for operating said cell, the movable depressor, 34, at the delivery end of said cell, mechanism for operating said depressor, the reciprocating plunger 33, and its operating mechanism, the slidable bottom plate, 31, in the cell and adapted to take over the margin of the box to be filled, and mechanism for operating said sliding bottom, substantially as set forth.

12. In a machine for filling match-boxes, the combination with the vertically-movable cell 32, and the means for moving the same, of the vibrating adjuster 35, adapted to even the matches in the cell by rubbing on their uncoated ends while the cell is elevated, substantially as set forth.

13. In a machine for filling match-boxes, the combination with the carrier for the match-box, and mechanism for placing the matches in the protruding drawer thereof, of the slidable hook 36, with a beveled under side, adapted to engage the margin of the box-case at its end and guide the matches into the drawer, and mechanism for operating said hook, substantially as set forth.

14. In a machine for filling match-boxes, the combination with the endless carrier, composed of flanged plates 8, and polygonal disks 9 and 9$^a$, mechanism for advancing said carrier intermittently, mechanism for placing the empty boxes on said carrier at one point and mechanism for pushing out the drawers of the boxes at another point, of a stationary, curved guide, 9$^b$, arranged over the carrier at the point set forth, and adapted to insure the boxes being pressed up to the flange on the main frame when they reach the point where the drawers are pushed out, substantially as set forth.

15. In a machine for filling match-boxes, the combination with the main frame, the intermittently-moving, endless carrier for the boxes, mounted on said frame, the upright box-magazine 12, on the main frame and at the inner side of the path of the carrier, the pusher for pushing out the lower tier of boxes onto the plates of the carrier, whereby the filled boxes are pushed off from the carrier, and mechanism for operating said pusher, of the inclined plate 18 on the frame down which the filled boxes slide, the tray 20, situated to receive the filled boxes, the slide 16, adapted for pushing the filled boxes into the tray, and mechanism for operating said slide, substantially as set forth.

In witness whereof I have hereunto signed my name in the presence of two subscribing witnesses.

ALEXANDER LAGERMAN.

Witnesses:
ERNST SVANGVIST,
E. HERMANSSON.